US012434322B2

(12) United States Patent
Cyphert et al.

(10) Patent No.: US 12,434,322 B2
(45) Date of Patent: Oct. 7, 2025

(54) ULTRASONIC WELDING WINDER MACHINE FOR CYLINDRICAL BATTERIES

(71) Applicant: Tech-Sonic, Inc., Columbus, OH (US)

(72) Inventors: David Lee Cyphert, Canal Winchester, OH (US); Byoung Soo Ou, Dublin, OH (US)

(73) Assignee: Tech-Sonic, Inc., Dublin, OH (US)

( * ) Notice: Subject to any disclaimer, the term of this patent is extended or adjusted under 35 U.S.C. 154(b) by 474 days.

(21) Appl. No.: 17/807,951

(22) Filed: Jun. 21, 2022

(65) Prior Publication Data

US 2023/0405706 A1 Dec. 21, 2023

(51) Int. Cl.

*B23K 20/10* (2006.01)
*B23K 20/26* (2006.01)
*B23K 37/04* (2006.01)
*B23K 101/36* (2006.01)

(52) U.S. Cl.

CPC .............. *B23K 20/10* (2013.01); *B23K 20/26* (2013.01); *B23K 37/0417* (2013.01); *B23K 2101/36* (2018.08)

(58) Field of Classification Search

CPC .. B29C 66/8161; B23K 20/10; B23K 20/106; B23K 20/233; B23K 20/2333; B23K 20/26; B23K 2101/16; B23K 2101/36; B23K 2101/38; B23K 2103/10; B23K 2103/12; B23K 2103/18; B23K 2103/26; B23K 37/0408; B23K 37/0417

See application file for complete search history.

(56) References Cited

U.S. PATENT DOCUMENTS 3,558,407 A 1/1971 Ballard
5,603,444 A 2/1997 Sato
5,931,367 A * 8/1999 Sato ..................... B23K 20/106 228/1.1
6,078,125 A * 6/2000 Roberts ..................... B06B 3/02 228/1.1

(Continued)

FOREIGN PATENT DOCUMENTS

CN 211680914 U 10/2020
DE 19513246 A1 * 4/1996 ............. B23K 20/10
KR 933791 B1 12/2009

*Primary Examiner* — Keith Walker
*Assistant Examiner* — Carlos J Gamino
(74) *Attorney, Agent, or Firm* — Emerson, Thomson & Bennett, LLC; Roger D. Emerson; Peter R. Detorre

(57) ABSTRACT

An ultrasonic tab welder, useful for welding metal ribbon to metal sheet, has an ultrasonic stack having a horn configured to include a pair of ends between which are one or more upstanding welding stud surfaces and held by a bracket assembly. The bracket assembly includes a horn holder terminating at either end with U-shaped legs holding either end of the horn and an upper U-shaped legs having a generally horizontal piece carrying a strain gauge. A T-shaped assembly mated with the horn holder U-shaped legs that are carried by a U-shaped holder by a pair of downward holder legs. A pair of bearing assemblies are captured between the downward holder legs, the upper holder U-shaped legs, and the horn holder up U-shaped legs. The horn upstanding welding stud surfaces conformingly mate with the metal ribbon as it is welded to the metal sheet.

14 Claims, 10 Drawing Sheets

(56) References Cited

U.S. PATENT DOCUMENTS

| | | | | |
|---|---|---|---|---|
| 6,168,063 | B1 * | 1/2001 | Sato | B23K 20/10 228/49.1 |
| 6,202,915 | B1 * | 3/2001 | Sato | H05K 13/0465 228/110.1 |
| 6,251,203 | B1 * | 6/2001 | Vala | B29C 66/8246 156/580.2 |
| 6,280,566 | B1 * | 8/2001 | Naito | B29C 65/0618 425/193 |
| 6,758,383 | B2 * | 7/2004 | Nishiura | B23K 20/10 228/180.5 |
| 7,854,247 | B2 * | 12/2010 | Sato | B23K 20/10 310/323.18 |
| 8,201,722 | B2 * | 6/2012 | Sato | B23K 20/106 156/580.2 |
| 8,950,458 | B2 * | 2/2015 | Patrikios | B29C 65/087 156/580.2 |
| 8,973,807 | B2 * | 3/2015 | Fujita | H01L 24/75 228/110.1 |
| 10,052,714 | B2 * | 8/2018 | Massa | B23K 20/106 |
| 2004/0065415 | A1 * | 4/2004 | Sato | B06B 3/00 156/580.1 |
| 2004/0211812 | A1 * | 10/2004 | Hizukuri | H01L 24/75 228/1.1 |
| 2006/0000870 | A1 * | 1/2006 | Matsumura | H01L 24/81 257/E21.511 |
| 2007/0187457 | A1 * | 8/2007 | Minamitani | H01L 24/81 228/1.1 |
| 2007/0199972 | A1 * | 8/2007 | Chong | B23K 20/10 228/1.1 |
| 2008/0087708 | A1 * | 4/2008 | Ozaki | H01L 24/75 228/1.1 |
| 2011/0220292 | A1 * | 9/2011 | Short | B32B 37/00 156/580.1 |
| 2018/0050497 | A1 * | 2/2018 | Sato | B29C 65/08 |
| 2020/0070276 | A1 * | 3/2020 | Ou | H01R 43/0263 |
| 2021/0044071 | A1 * | 2/2021 | Mathews | H01R 4/02 |
| 2021/0098766 | A1 | 4/2021 | Ban | |

* cited by examiner

ULTRASONIC WELDING WINDER MACHINE FOR CYLINDRICAL BATTERIES

CROSS-REFERENCE TO RELATED APPLICATIONS

None.

STATEMENT REGARDING FEDERALLY SPONSORED RESEARCH AND DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM

Not applicable.

STATEMENT REGARDING PRIOR DISCLOSURES BY THE INVENTOR OR A JOINT INVENTOR

Not applicable.

BACKGROUND OF THE INVENTION

The present disclosure relates to the manufacture of cylindrical batteries and more particularly to an ultrasonic welder for the welding of a flat wire terminals (anode or cathode) to a metal sheet (anode or cathode) for forming cylindrical batteries.

A variety of present day portable/movable electrically powered items from lawn mowers to electric shavers to automobiles to hoverboards to ad infinitum, require batteries for power. A common battery type for those listed and other products rely on the ubiquitous cylindrical battery. We use them in so many products that we take them for granted, especially when it comes to safety.

Yet, these common batteries can fail, resulting in fire and explosions. That risk comes at the battery factory, the carrier transporting the batteries to a distributor, to a store, and finally to an end user. At all of these stages, the is risk for battery failure with consequent fire, explosion, or both. These battery failures were documented by the Consumer Product Safety Commission in a report prepared by the CPSC staff for the International Battery Seminar dated Mar. 27, 2018. A prime culprit for such documented battery failures was due to a poor ultrasonic weld of an anode/cathode to the battery foil. The welding head (horn) did not always result in complete welds across the horn resulting in short circuits and other failure modes including, for example, over-welded tabs, which result in metallic spikes that can punch through the separator material and short-circuit the anode and cathode and improperly aligned welding horns that can cause under-welded and over-welded connections on opposite ends of the tab weld.

It is to such safety issue that the present invention is addressed.

BRIEF SUMMARY OF THE INVENTION

A demonstration ultrasonic tab welding machine (10) having a stack assembly (22) is adapted for welding metal ribbon (24, e.g., aluminum or nickel cathode) to a metal sheet (16, e.g., copper foil anode) useful to manufacture cylindrical batteries. In particular, demonstration ultrasonic tab welding machine 10 is useful for welding Li ion battery anode electrode sheets copper foil and Ni tab onto current collectors to prepare Li-Ion pouch cells and cylinder cell. A holder assembly (23) provides self-leveling between the welding hammers or studs (e.g., 80, 84, 88, etc.) of the horn (54) and the anvil assembly (20). Such self-leveling feature ensures that all of the ultrasonic welds are complete and uniform.

The holder assembly includes an upside down U-shaped upper bracket assembly 60 (also referred to as upper bracket assembly or upper bracket), the downwardly extending legs 116 of which retain a self-leveling assembly, which includes a U-shaped lower bracket assembly 62 (also referred to as lower bracket assembly or lower bracket) and a generally T-shaped middle holder 64 (also referred to as middle holder) having a generally downwardly extending vertical leg 118. Between the vertical leg of the middle holder the upper legs of the lower bracket assembly is located a strain gage assembly 66 through which the compressive force of the ultrasonic welding happens.

A pair of bearing assemblies (65A, 65B) are located between the legs of the upper bracket assembly and both the middle holder and the lower bracket assembly, wherein the bearing assemblies (65A, 65B) are either ball bearing assemblies or roller bearing assemblies. An adjustable space between the middle holder and the lower bracket assembly is defined, such as by an adjustable screw (76). Each of the bearing assemblies define a space between the upper bracket assembly and the middle holder.

The downwardly extending legs 114 of the U-shaped lower bracket assembly (62) terminate with a pair of nodal point retainers (57 A-D) that retain the horn. The downwardly extending legs 114 of the U-shaped lower bracket assembly (62) also have a pair of holders (67A, 67B) located vertically above the nodal point retainers which rest on horn 54 for capturing horn 54 between the nodal point retainers and the holder pairs.

In a general sense the disclosed ultrasonic welding machine has a holder assembly for holding the welding horn and which houses a self-leveling assembly composed of a pair of holders that permit the welding horn to swing front-to-back and side-to-side. The swings are confined to be quite small, but of sufficient swing to ensure that the hammers are in uniform contact with the surfaces to be welded.

BRIEF DESCRIPTION OF THE SEVERAL VIEWS OF THE DRAWINGS

For a fuller understanding of the nature and advantages of the present method and process, reference should be had to the following detailed description taken in connection with the accompanying drawings, in which.

The drawings will be described in greater detail below.

DETAILED DESCRIPTION OF THE INVENTION

Figure 1:
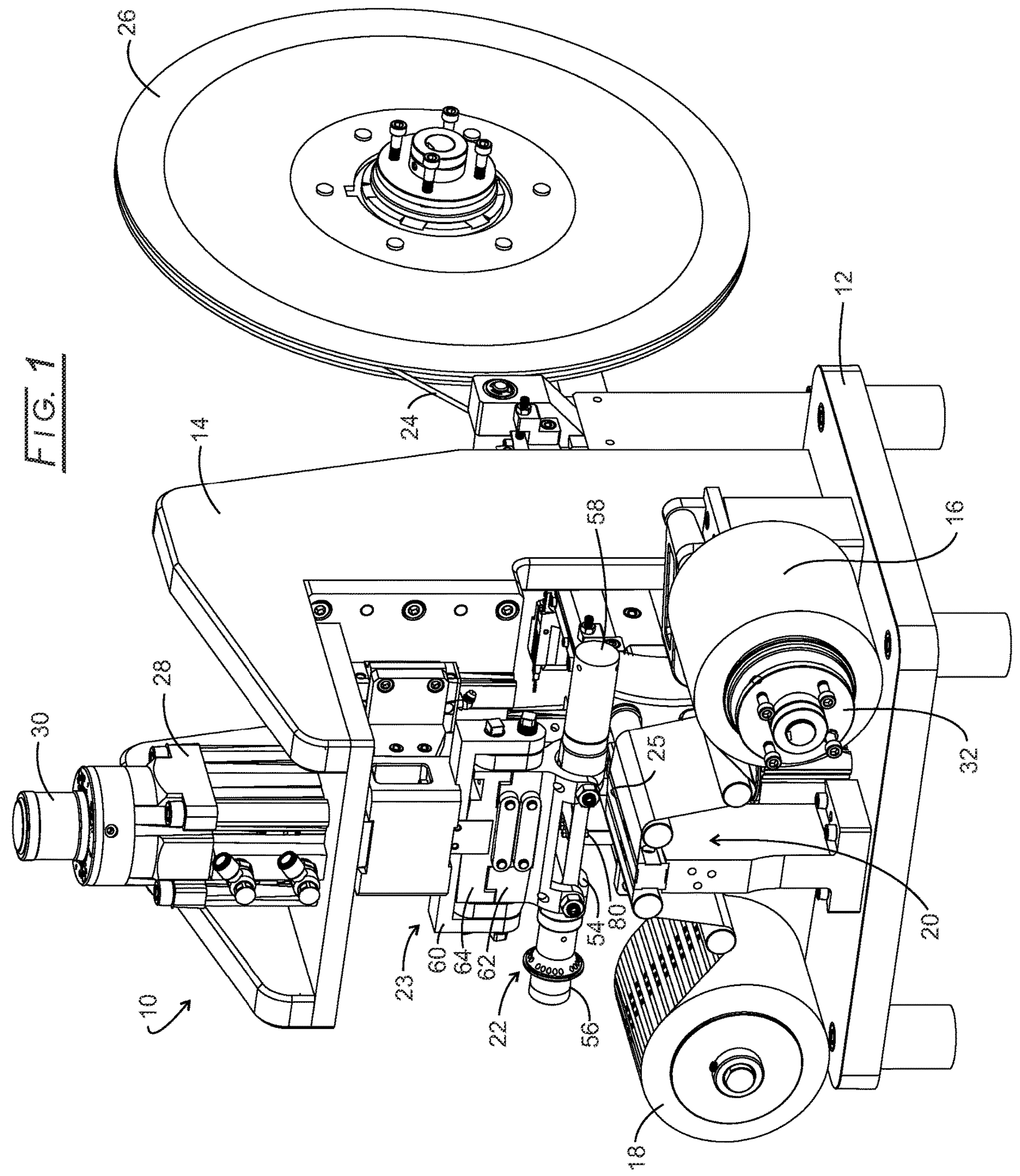
FIG. 1 is a front isometric view of the demonstration ultrasonic tab welder.

In order to demonstrate the disclosed ultrasonic tab welder and the unique horn holder assembly, a demonstration machine was constructed. Those skilled in this art will appreciate that tab welder is but one small part of the overall machine that produces terminal welded sandwich assemblies useful in the production of cylindrical batteries. The disclosed demonstration ultrasonic tab welder, 10, is shown in isometric view in FIG. 1. Atop a table, 12, is a frame assembly, 14, that supports the various components of machine 10. Basically, a feed coil of sheet metal, e.g., copper, 16, is pulled by take-up coil, 18, across an anvil assembly, 20, where an ultrasonic stack assembly, 22, ultrasonically welds a metal ribbon, 24, fed from a coil, 26, to sheet metal 16. Stack assembly 22 is held and positioned by a holder assembly, 23. A pneumatic air cylinder assembly, 28, moves ultrasonic stack assembly 22 vertically from a home (up) position downwardly to a welding position and back to its home position. An adjustment knob, 30, is provided for pneumatic air cylinder assembly, 28. Metal coil 16 is pulled against resistance provided by an axle assembly, 32. A controller (not shown) actuates movement of ultrasonic stack assembly 22 in registration with ribbon 24 laying atop coil 16 for its welding with information from a strain gauge 66 (shown and described later herein).

Figure 2:
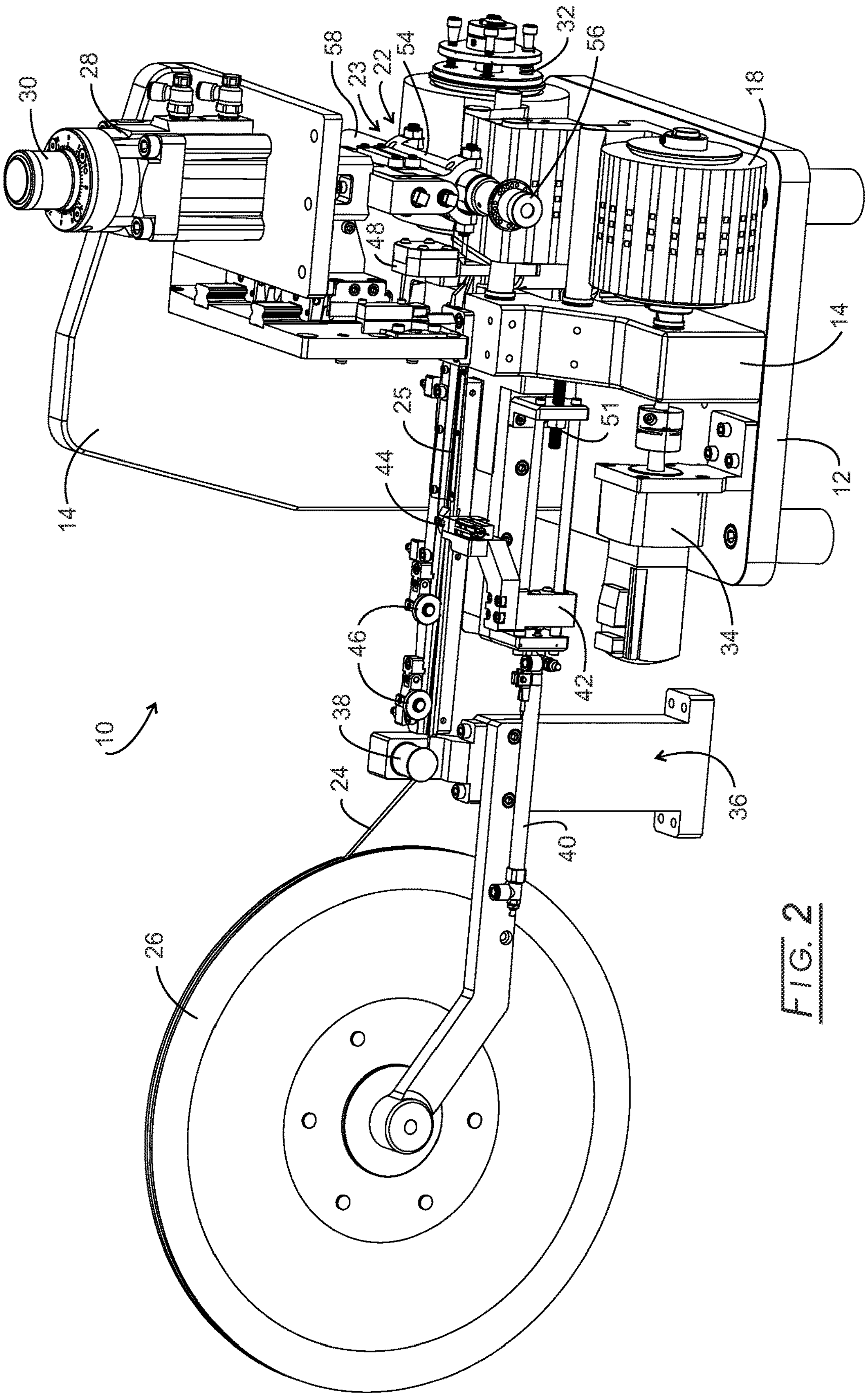
FIG. 2 is a side isometric view of the demonstration ultrasonic tab welder with part of the frame removed to reveal the ultrasonic welder details.
Figure 3:
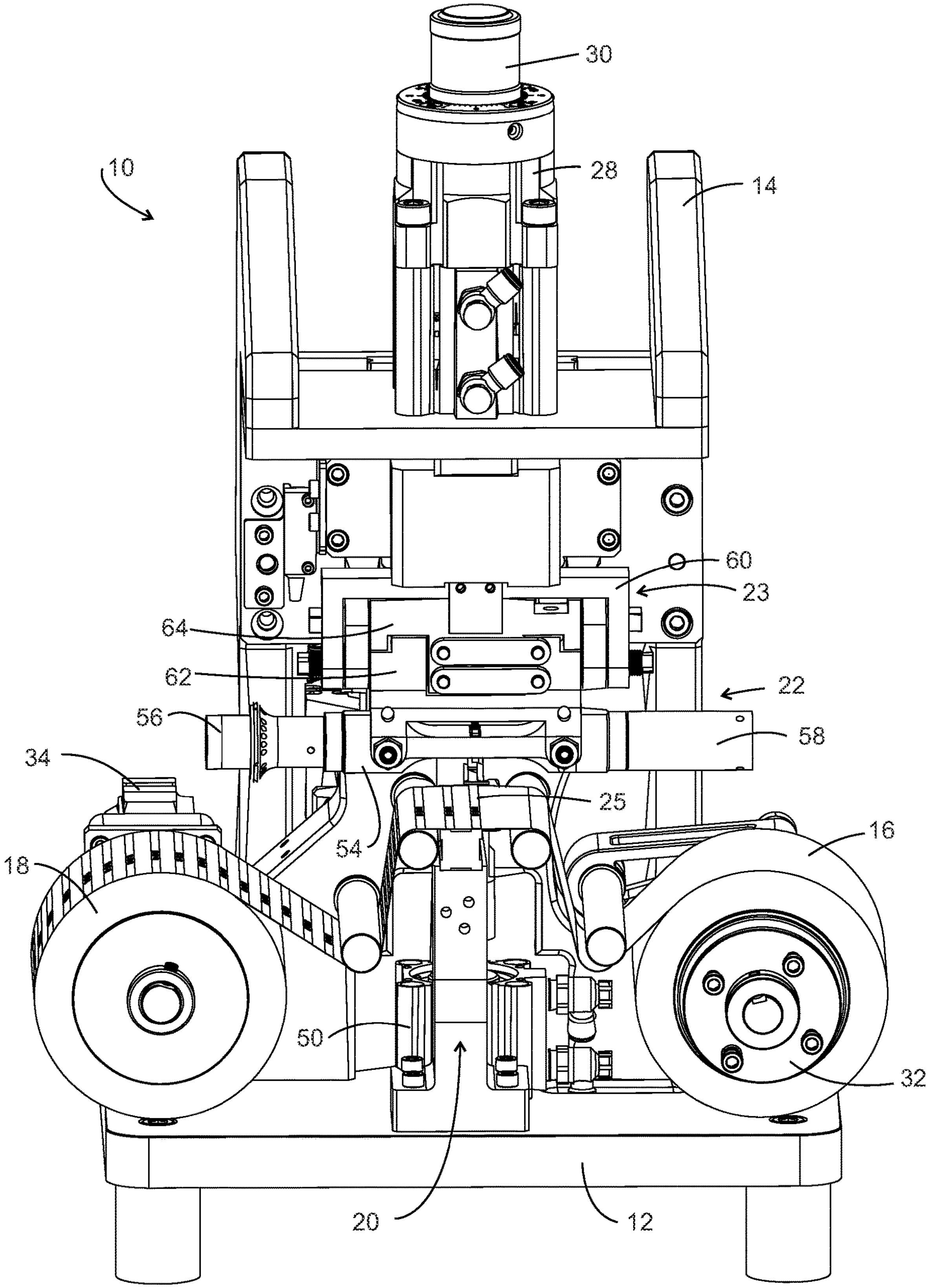
FIG. 3 is a front isometric view of the demonstration ultrasonic tab welder machine.
Figure 4:
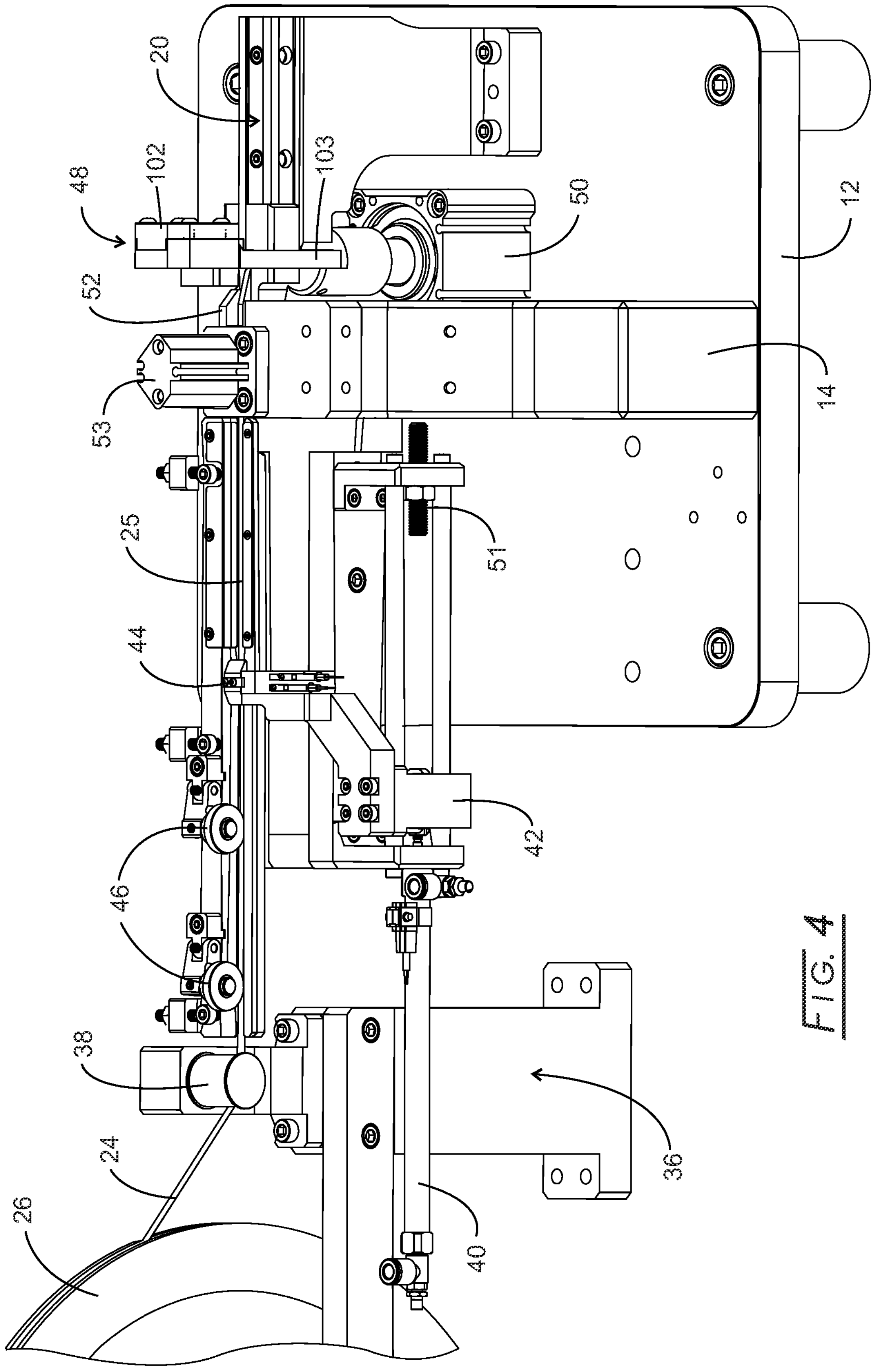
FIG. 4 is a side elevational view of the demonstration ultrasonic tab welder with the frame removed to reveal the ultrasonic welder details.

Referring additionally to FIGS. 2 and 4, an electric drive motor assembly, 34, (e.g., stepper motor, linear actuator, or the like) is seen in driving relationship with take-up coil 18. Coil 26 is carried by a coil support assembly, 36, consisting of an arm and stand assembly. The stand of coil support assembly 36 is topped by a roller assembly, 38, for metal ribbon 24. Metal ribbon 24 is pulled by a cylinder assembly, attached is a bracket assembly, 42, which is terminated with a clamping mechanism, 44. Clamping mechanism 44 grasps metal ribbon 24 and unwinds it from coil 26. As metal ribbon 24 is unwound it passes under a dual roller assembly, 46, whereby metal ribbon 24 is straightened to a flat metal ribbon configuration, 25, and then moved past frame 14. Bracket assembly 42 returns clamp 44 to its starting position by cylinder assembly 40 after the welding process. Thus, metal ribbon 24 is moved and straightened a discrete distance determined by the throw of cylinder assembly 40. As straightened flattened metal ribbon 25 passes through frame assembly 14, it is cut by a cutter mechanism, 48, which is powered by a cylinder (pneumatic) assembly, 50. An adjustment assembly, 51, adjusts the length of metal ribbon 25 that is cut for ultrasonically welding to metal sheet coil 18.

Figures 5, 6:
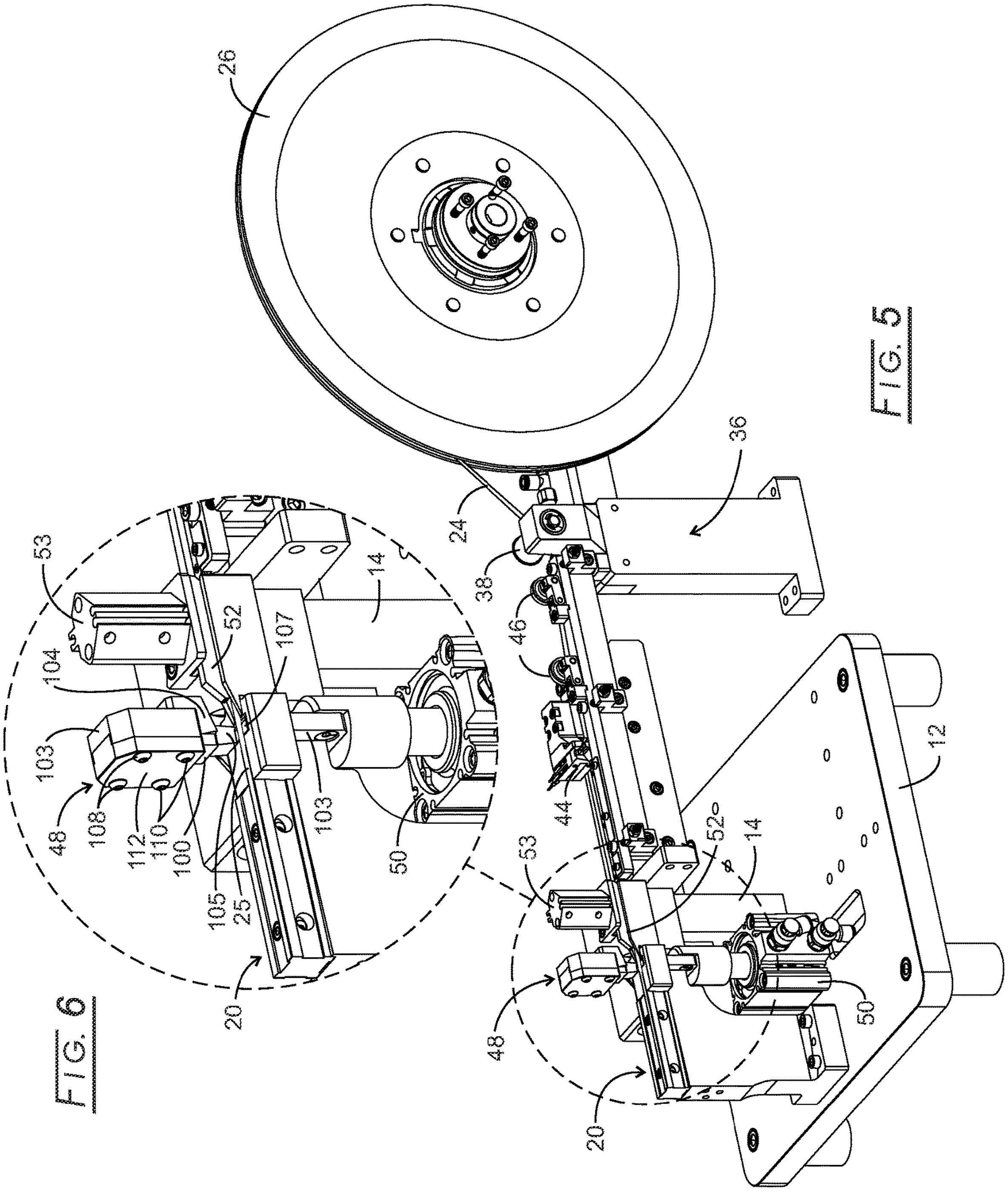
FIG. 5 is an isometric view of the demonstration ultrasonic tab welder of FIG. 4.
FIG. 6 is an enlarged view of the feed mechanism for the demonstration ultrasonic tab welder.

Referring now to FIGS. 5 and 6, it will be observed that as flat metal ribbon 25 approaches cutter mechanism 48, it proceeds under an alignment clamp, 52, and then underneath cutter mechanism 48. It is to be noted that cutter mechanism 48 stays in its cutting position as metal ribbon 25 is ultrasonically welded to metal coil sheet 16, whereupon it returns to its up or home position. The cutting operation will be detailed later herein.

Figure 7:
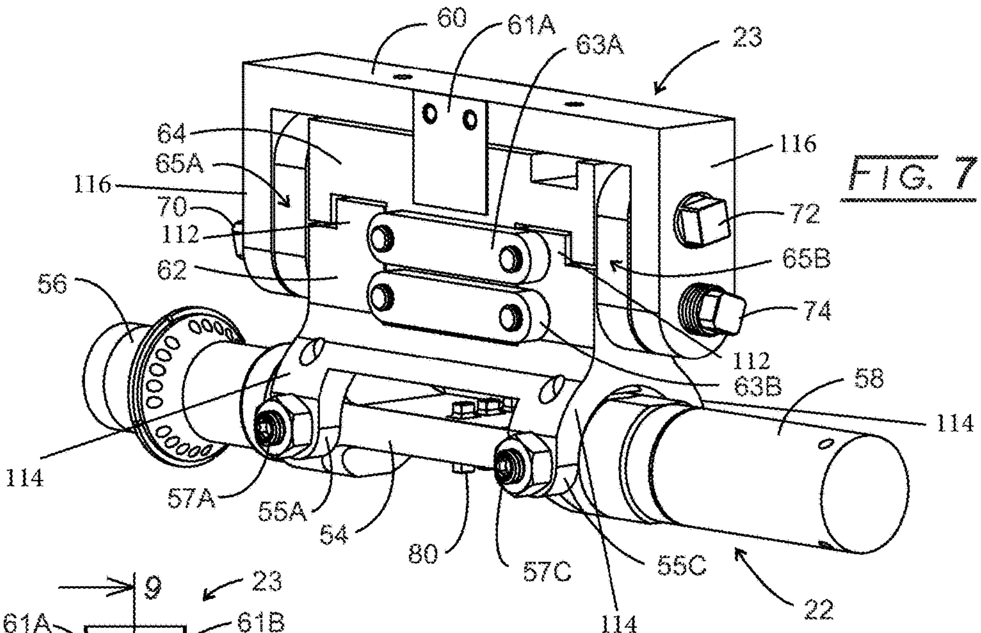
FIG. 7 is an isometric view of the ultrasonic stack assembly therefor.
Figure 8:
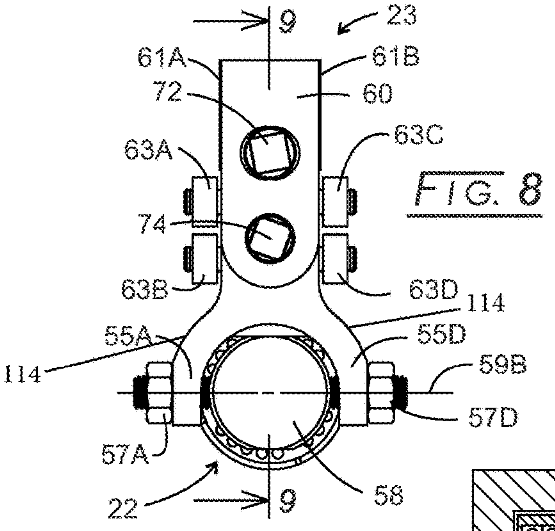
FIG. 8 is and end view of the ultrasonic stack assembly of FIG. 7.
Figure 9:
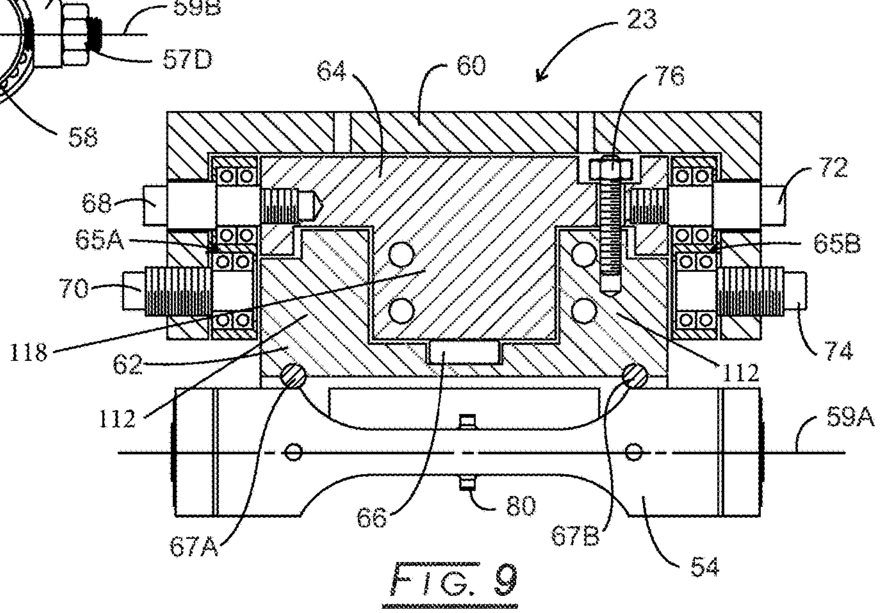
FIG. 9 is a sectional view taken along line 9-9 of FIG. 8.

Referring now to FIGS. 7-9, stack assembly 22 and holder assembly 23 are shown in greater detail. Holder assembly 23 has a pair of upside-down U-shaped brackets, comprising brackets 55A, 55B, 55C, and 55D, at either end. All four brackets have set screw assemblies, 57A, 57B, 57C, and 57D, for holding either end of a horn, 54 of stack assembly 22. This arrangement of set screws reduces the vibrational transfer to the holder assembly 23 from stack assembly 22. Note that bracket 55B with its set screw assembly 57B are not shown in the drawings. In addition to horn 54, stack assembly 22 includes a converter, 56, and support block, 58.

Holder assembly 23 is composed of an upper U-shaped bracket, 60, and a lower U-shaped bracket assembly, 62, between which is a middle holder assembly, 64. Middle holder assembly 64 includes brackets 55A-55D. Between lower U-shaped bracket assembly 62 and middle holder assembly 64 is a strain gauge, 66. Adjustable screws, 68, 70, 72, and 74, hold the components of holder assembly 23 together. A vertical adjustable screw, 76, also is seen extending between middle holder assembly 64 and lower U-shaped bracket assembly 62 restricting lower U-shaped bracket assembly 62 vertical movement.

There are two laterally extending arms and bolt assemblies, a first laterally extending arm and bolt assembly, "63A and 63B", and a second laterally extending arm and bolt assembly, "63C and 63D", that can be seen in FIGS. 7 and 8, that allow limited vertical motion while maintaining parallel orientation of the horn relative to the anvil. Specifically, arm and bolt assemblies "63A and 63B" and "63C and 63D", each consist of two lateral plates and nut and bolt assemblies at either end. One of the same end of each assembly on either side of holder assembly 23 extends into middle holder assembly 64, while the opposite of the same end of each assembly extend into lower U-shaped bracket assembly 62. The arm and bolt assemblies, then secure lower U-shaped bracket assembly 62 and middle holder assembly 64 in position. A pair oppositely disposed stops or restraints, 61A and 61B, secure upper U-shaped bracket 60 and middle holder assembly 64, so that that middle holder assembly 64 is restrained from rotating too far about adjustable screws 68 and 72 and keep middle holder assembly 64 in a vertical position.

Held between the downward extending legs of upper bracket 60 and lower bracket 62/middle holder 64 are bearing assemblies, 65A and 65B, which each have an upper and a lower bearing pair. Upper U-shaped bracket 60 is secured to middle holder 64 by adjustable screws 68 and 72 that pass-through the upper bearings of bearing assemblies 65A and 65B. Adjustable screws 70 and 74 pass through the lower set of bearings of bearing assemblies, 65A and 65B. It should be understood that any sprag mechanism can be substituted for the useful ball bearing assemblies.

Horn 54 has hammers 80 (also referred to as "welding hammers" or "welding studs") arranged so they are in the center of the longitudinal axis, 59A, of horn 54 or the center between the set screw arrangement 57 A, 57C and 578, 57D where the downward force is applied to hammers 80 through strain gauge 66. Lower bracket 62 can rotate slightly about the center of longitudinal axis 59A of horn 54 through its vertical movement. Horn 54 also has a transverse longitudinal axis, 59B, that is defined by set screw arrangement 57A, 57B and 57C, 57D. This arrangement allows slight transverse rotation along longitudinal axis 59B through bearing assemblies 65A and 65B. The various components of holder assembly 23 are held sufficiently tight to appear as a single unit, but not so tight that slight rotational movement about longitudinal axes of horn 54 is permitted to self-align horn 54." Horn Upstanding Welding Stud Surfaces (81) provide a surface where the metal ribbon may conformingly mate to the metal sheet either before the metal ribbon is welded to the metal sheet, as the metal ribbon is being welded to the metal sheet or where the metal ribbon may conformingly mate with material to be ultrasonically welded prior to initiation of ultrasonic welding.

A variety of horn configurations are shown in FIGS. 10-15 for use with ultrasonic tab welder 10. It will be observed that the welding horn can support multiple upstanding welding hammers for simultaneously ultrasonically welding the metal ribbon to multiple locations on the metal sheet. Moreover, such welding hammers can be contained on both sides of the horn enabling the manufacturer to extend the life of the horn prior to its replacement with a new horn.

Figure 10:
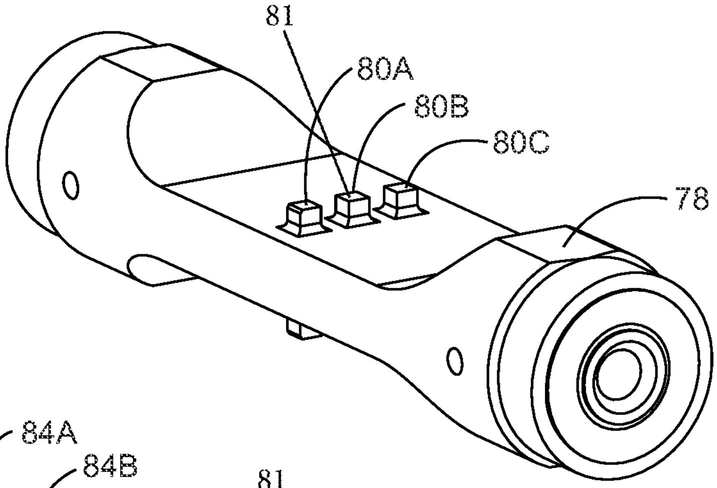
FIG. 10 is an isometric view of the ultrasonic welding horn with 3 ultrasonic welding areas on either side of the ultrasonic welding horn.
Figure 11:
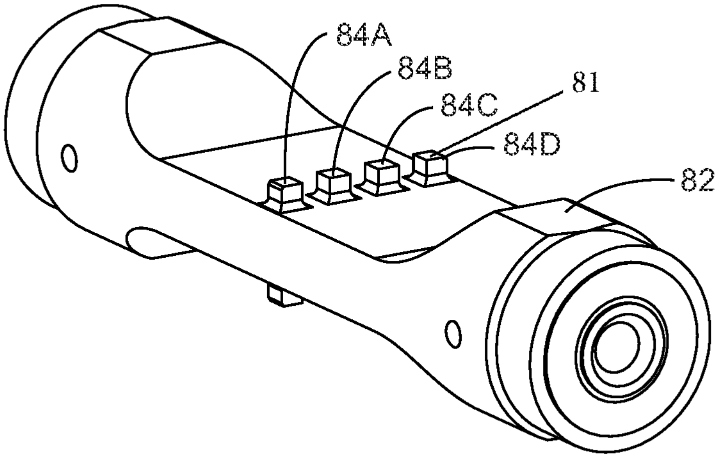
FIG. 11 is an isometric view of the ultrasonic welding horn with 4 ultrasonic welding areas on either side of the ultrasonic welding horn.
Figure 12:
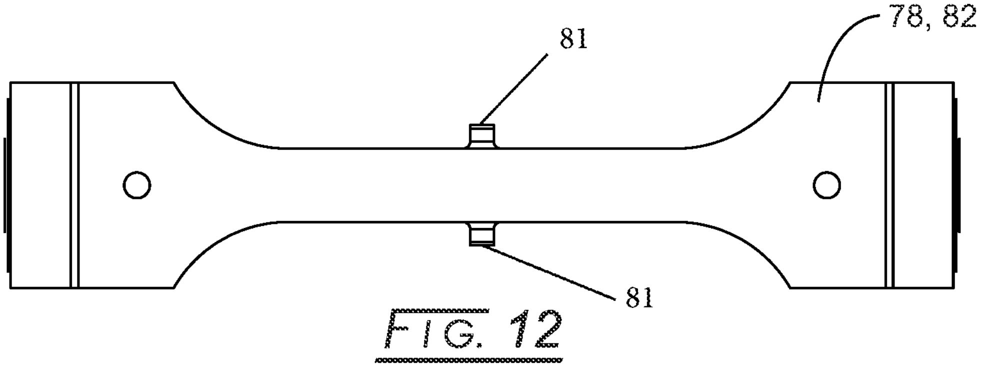
FIG. 12 is a side view of the ultrasonic welding horns of either FIG. 10 or FIG. 11.
Figure 13:
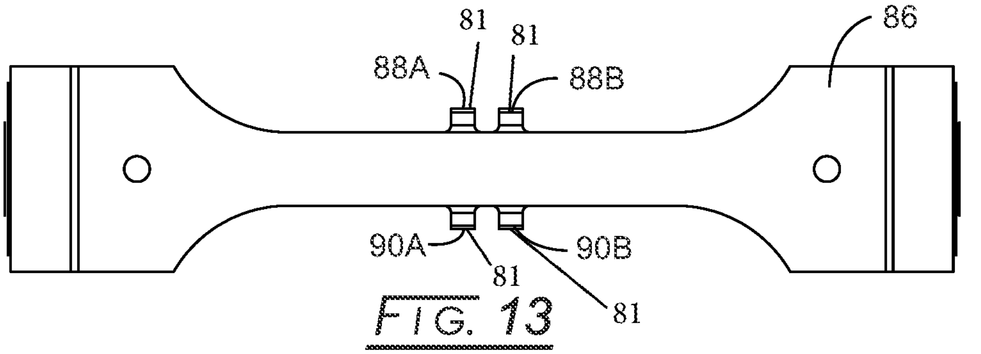
FIG. 13 is a side view of an ultrasonic welding horn with 2 rows of ultrasonic welding areas on both sides of the ultrasonic welding horn.

Specifically, horn 78 in FIGS. 10 and 12 has 3 hammers, 80A, 80B, and 80C, on its top. An additional 3 hammers, not seen, are carried on the opposite side of horn 78. Similarly in FIGS. 11 and 12, horn 82 carries upstanding hammers, 84A, 84B, 84C, and 84D. The horn in FIG. 12 shows both horns 78 and 82, as their side views would be the same. Horn 86 in FIG. 13 shows hammers 88A and 88B on its top side and hammers 90A and 90B on the horns bottom side. The number of hammers could be 1, 2, 3, 4, etc. in FIG. 13 for both the top and the bottom of horn 86. Thus, the number of welding hammers can be designed by the user to accommodate the needs.

Figure 14:
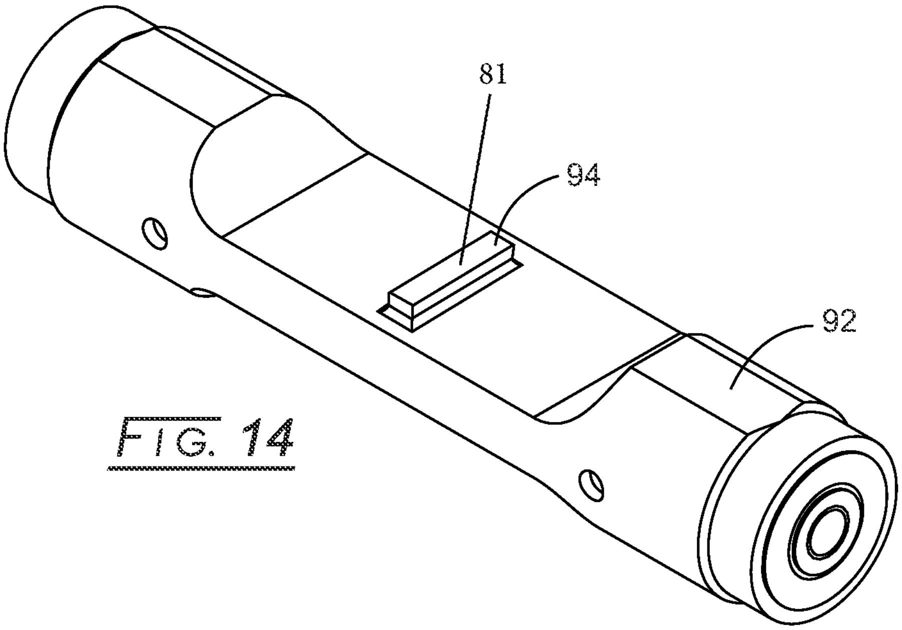
FIG. 14 is an isometric view of an ultrasonic welding horn with an elongate welding area.
Figure 15:
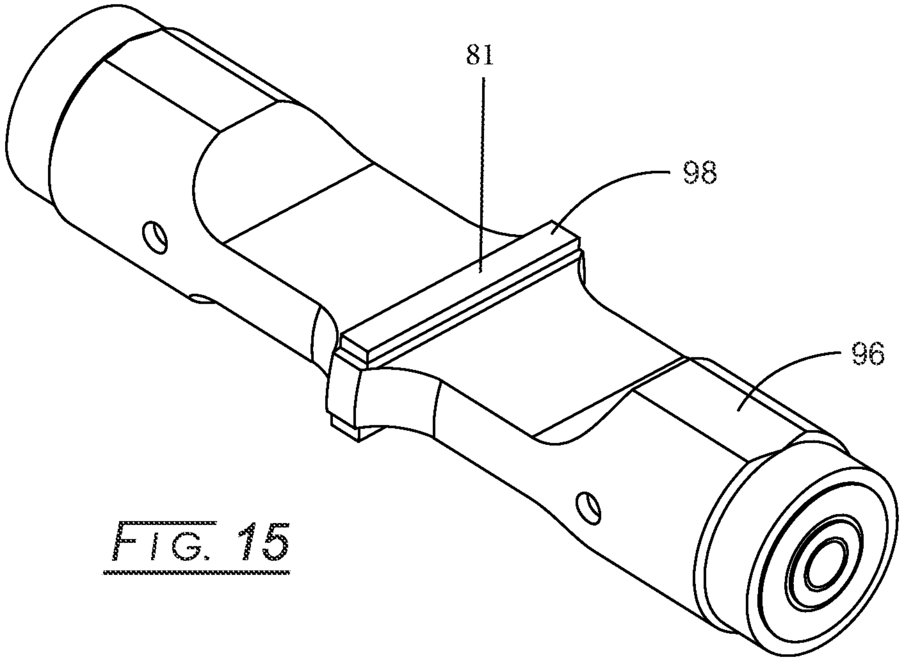
FIG. 15 is an isometric view of an ultrasonic welding horn with an elongate welding area longer than that shown in FIG. 15.

Elongate hammers or welding surfaces 94 and 98 are illustrated in FIGS. 14 and 15 for horns 92 and 96, respectively. Such elongated welding surfaces enable the horn to vibrate at a lower frequency. Again, the length of the hammers or welding surface can be varied to suit the user on both the top and bottom of the horns.

Figure 16:
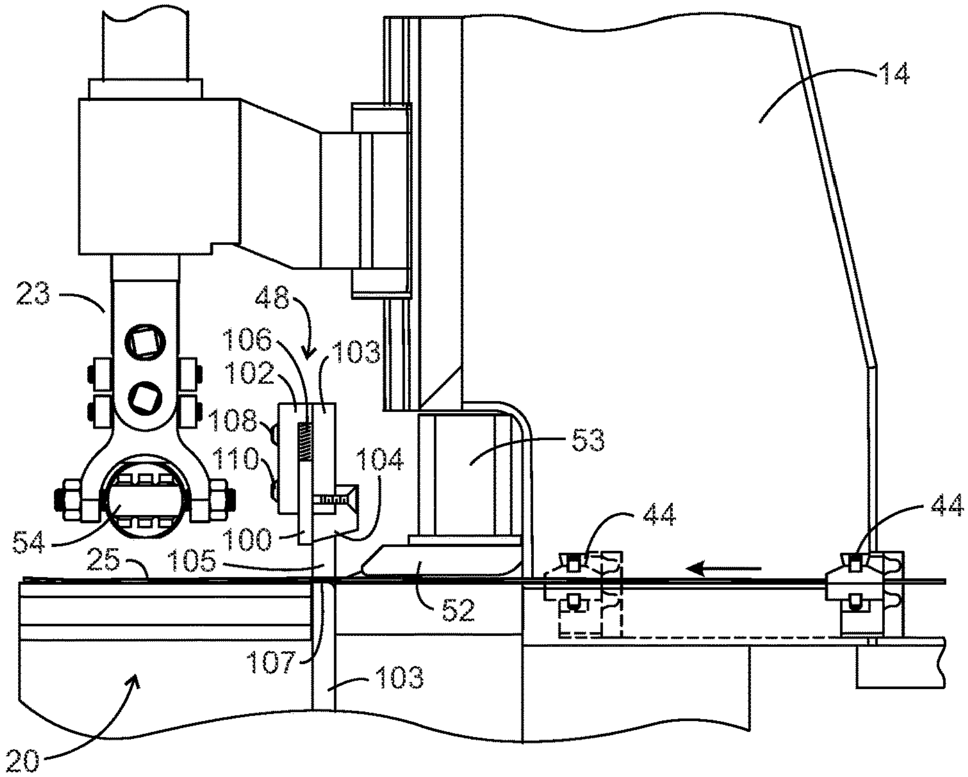
FIG. 16 is a side elevational view of the demonstration ultrasonic tab welder showing the wire cutter in an up or home position and the horn in a home (non-welding) position.
Figure 17:
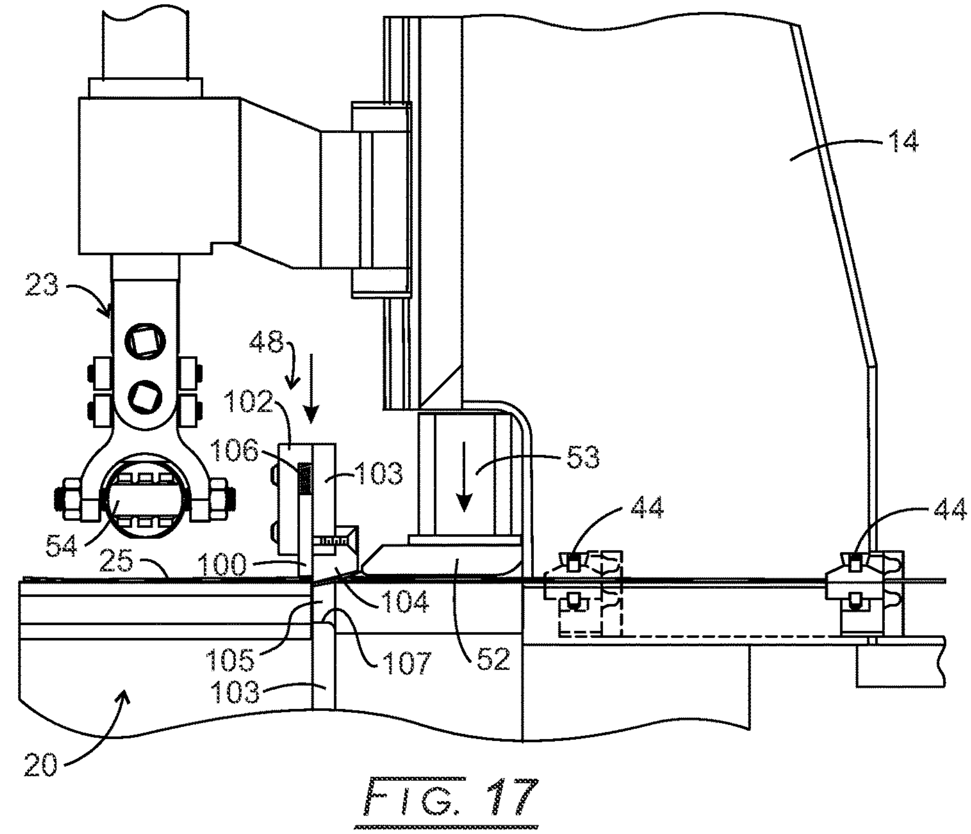
FIG. 17 is a side elevational view of the demonstration ultrasonic tab welder showing the wire cutter in a down or cutting position; and the horn in a home (non-welding) position.

Referring now to FIGS. 16 and 17, the ribbon feeding, cutting and welding operation is shown in further detail for its understanding. Holder assembly 23 for horn 54 of stack assembly 22 and cutter assembly 48 are shown in greater detail for cutting metal ribbon 25. Cutter assembly 48 is in an up or home position in FIG. 17, while ribbon 25 is fed forward under cutter assembly 48 by cylinder assembly 40 and clamp 44. Cutter assembly 48 is in its down or cutting position in FIG. 18. Alignment clamp 52 is operated by cylinder 53 clamping ribbon 25 while the ribbon is being cut. Horn 54, however, remains in its up or home position in both FIGS. 16 and 17. Cutter assembly 48 includes a clamp, 100 in housing 102, carrying a blade assembly, 104. Clamp 100 is biased by a spring, 106, trapped within housing 102. Set screws, 108 and 110, hold the clamp in place to a plunger bracket, 103. Blade 104 also is fastened to plunger bracket 103 as is cutter assembly 48. Plunger bracket 103 has a slot, 105, in it that allows the ribbon 25 to pass through. The bottom of slot 105 has a ledge, 107, that contacts the end of the ribbon 25 bending it slightly upwardly when the cutter assembly returns to home position and while being held by clamp 52. The bent end of ribbon 25 then will clear medal sheet 16 on anvil 20 when cylinder assembly 40 with clamp 44 feeds ribbon 25 forward over metal sheet 16.

Figure 18:
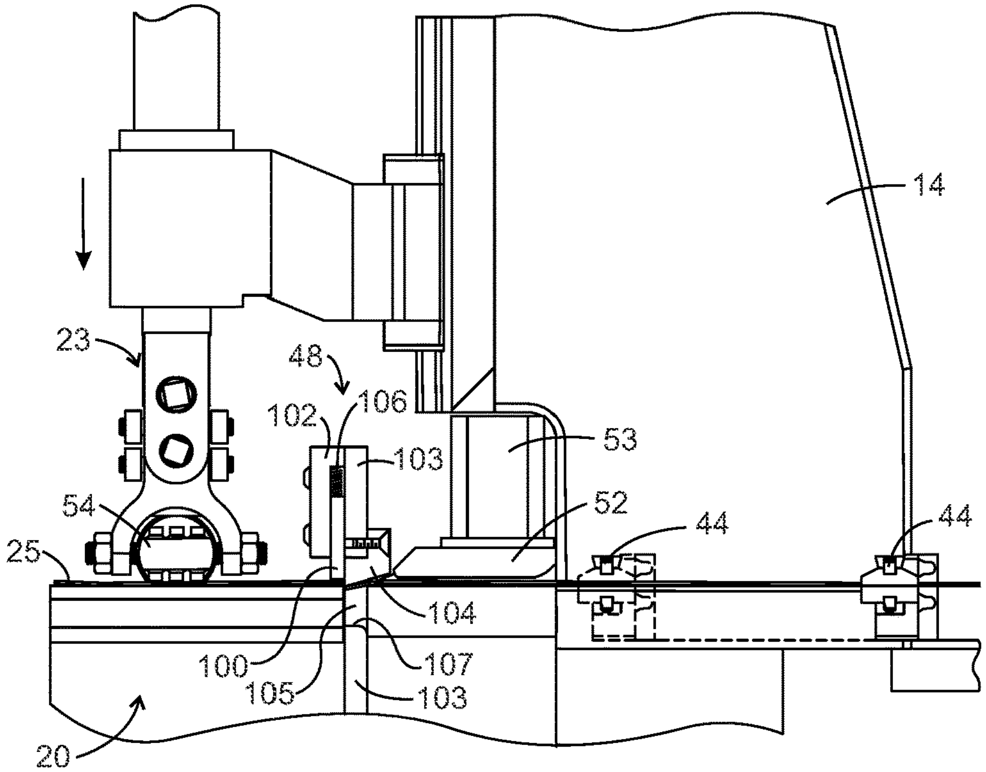
FIG. 18 is a side elevational view of the demonstration ultrasonic tab welder showing the wire cutter in a down or cutting position and the horn moved downwardly for welding position.
Figure 19:
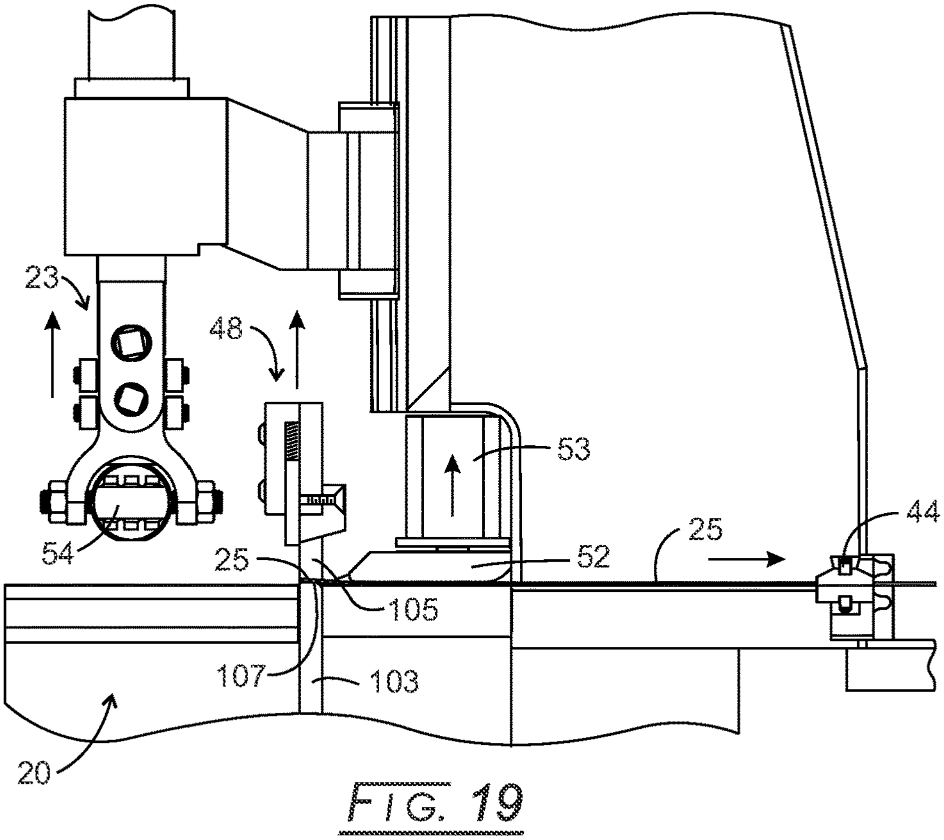
FIG. 19 is a side elevational view of the demonstration ultrasonic tab welder showing the wire cutter moving upwardly from its cutting position and the horn also moving upwardly from its welding position.

Cutter assembly 48 remains in the down or cutting position during the welding operation, as is illustrated in FIG. 18 where horn 54 is seen in contact with ribbon 25 for its welding to metal sheet 16. By remaining in a down or cutting position, cutter assembly 48 holds cut ribbon 25 in position with clamp 100 so that it does not move. This ensures that ribbon 25 is welded in its intended position. In FIG. 20, both horn 54 and cutter assembly 48 have returned to their home positions. Clamp 52 holds ribbon 25 in place while cylinder assembly 40 retracts to home position. Clamp 52 raises to home position, medal sheet 16 indexes and the ribbon feeding, cutting, and welding process restarts.

While the apparatus, system, and method have been described with reference to various embodiments, those skilled in the art will understand that various changes may be made, and equivalents may be substituted for elements thereof, without departing from the scope and essence of the disclosure. In addition, many modifications may be made to adapt a particular situation or material in accordance with the teachings of the disclosure without departing from the essential scope thereof. Therefore, it is intended that the disclosure is not limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

The invention claimed is:

1. In an ultrasonic tab welding machine (10) for welding a metal ribbon (25) to a metal sheet (16), the ultrasonic tab welding machine being useful to manufacture a cylindrical battery, an improved stack assembly, which comprises:

(a) an ultrasonic stack assembly (22) having a horn (54), the horn (54) configured to include a pair of ends between which are one or more upstanding welding studs (80, 84, 88, 90, 94, 98) configured to ultrasonically weld the metal ribbon to the metal sheet; and (b) a holder assembly (23) for the ultrasonic stack assembly (22) comprising:

(i) an upside down U-shaped upper bracket assembly (60) having downwardly extending legs (116);

(ii) a U-shaped lower bracket assembly (62) having upwardly extending legs (112) and downwardly extending legs (114);

(iii) a generally T-shaped middle holder (64) having a generally downwardly extending vertical leg (118);

(iv) a strain gage assembly (66), which experiences a compressive force of an ultrasonic welding, located between the generally downwardly extending vertical leg (118) of the generally T-shaped middle holder (64) and the upwardly extending legs (112) of the U-shaped lower bracket assembly (62);

(v) a pair of bearing assemblies (65A, 65B) which are located between the downwardly extending legs of the upside down U-shaped upper bracket assembly (60), and both the generally T-shaped middle holder (64) and the U-shaped lower bracket assembly (62);

(vi) an adjustable screw (76) which extends generally vertically adjacent to the generally T-shaped middle holder (64) and into the U-shaped lower bracket assembly (62);

(vii) four brackets (55A, 55B, 55C, and 55D) which extend from the downwardly extending legs (114) of the U-shaped lower bracket assembly (62) and which each respectively house set screw assemblies (57A, 57B, 57C, and 57D) for holding the horn (54); and, (viii) a first laterally extending arm and bolt assembly (63A and 63C) and a second laterally extending arm and bolt assembly (63B and 63D), wherein the first and second laterally extending arm and bolt assemblies ("63A and 63C" and "63B and 63D") allow limited vertical motion of the holder assembly (23) while maintaining a parallel orientation of the horn (54) relative to an anvil (20), wherein a first end of the laterally extending arm and bolt assemblies ("63A and 63C" and "63B and 63D") extends through the generally T-shaped middle holder (64) and a second end of the laterally extending arm and bolt assemblies ("63A and 63C" and "63B and 63D") extends through the U-shaped lower bracket assembly (62) to secure the U-shaped lower bracket assembly (62) and the generally T-shaped middle holder (64) in position, whereby the one or more upstanding welding studs (80, 84, 88, 90, 94, 98) conformingly mate with the metal ribbon before the metal ribbon is welded to the metal sheet.

2. The ultrasonic welding machine of claim 1, wherein the each laterally extending arm and bolt assembly ("63A and 63C" and "63B and 63D") comprises two stacked lateral plates having ends through which nut and bolt assemblies are secured.

3. The ultrasonic welding machine of claim 1, wherein the horn (54) carries the one or more upstanding welding studs (80, 84, 88, 90, 94, 98) on a first side surface and a second side surface of the horn (54).

4. The ultrasonic welding machine of claim 1, wherein a pneumatic air cylinder assembly (28) moves the ultrasonic stack assembly (22) vertically from a home position downwardly to a welding position and back to the home position.

5. The ultrasonic welding machine of claim 1, wherein the welding metal ribbon is continuously fed for the ultrasonic welding of the metal ribbon to the metal sheet.

6. The ultrasonic welding machine of claim 1, wherein a cutter assembly (48) is provided to cut the metal ribbon after the metal ribbon is ultrasonically welded to the metal sheet.

7. A method for ultrasonically welding a metal ribbon (25) to a metal sheet (16) with an ultrasonic welding machine (10), the method being useful to manufacture a cylindrical battery, the method comprising the steps of:

(I) providing an ultrasonic welding machine having a stack assembly, which comprises:

(a) an ultrasonic stack assembly (22) having a horn (54), the horn (54) configured to include a pair of ends between which are one or more upstanding welding studs (80, 84, 88, 90, 94, 98) configured to ultrasonically weld the metal ribbon to the metal sheet; and (b) a holder assembly (23) comprising (i) an upside down U-shaped upper bracket assembly (60) having downwardly extending legs (116);

(ii) a U-shaped lower bracket assembly (62) having upwardly extending legs (112) and downwardly extending legs (114);

(iii) a generally T-shaped middle holder (64) having a generally downwardly extending vertical leg (118);

(iv) a strain gage assembly (66), which experiences a compressive force of an ultrasonic welding, located between the generally downwardly extending vertical leg (118) of the generally T-shaped middle holder (64) and upwardly extending legs (112) of the U-shaped lower bracket assembly (62);

(v) a pair of bearing assemblies (65A, 65B) which are located between the downwardly extending legs of the upside down U-shaped upper bracket assembly (60), and both the generally T-shaped middle holder (64) and the U-shaped lower bracket assembly (62);

(vi) an adjustable screw (76) which extends generally vertically adjacent to the generally T-shaped middle holder (64) and into the U-shaped lower bracket assembly (62);

(vii) four brackets (55A, 55B, 55C, and 55D) which extend from the downwardly extending legs (114) of the U-shaped lower bracket assembly (62) and which each respectively house set screw assemblies (57A, 57B, 57C, and 57D) for holding the horn (54);

(viii) a first laterally extending arm and bolt assembly (63A and 63C) and a second laterally extending arm and bolt assembly (63B and 63D), wherein the first and second laterally extending arm and bolt assemblies ("63A and 63C" and "63B and 63D") allow limited vertical motion of the holder assembly (23) while maintaining a parallel orientation of the horn (54) relative to an anvil (20), wherein a first end of the laterally extending arm and bolt assemblies ("63A and 63C" and "63B and 63D") extends through the generally T-shaped middle holder (64) and a second end of the laterally extending arm and bolt assemblies ("63A and 63C" and "63B and 63D") extends through the U-shaped lower bracket assembly (62) to secure the U-shaped lower bracket assembly (62) and the generally T-shaped middle holder (64) in position;

whereby the one or more upstanding welding studs (80, 84, 88, 90, 94, 98) conformingly mate with the metal ribbon as the metal ribbon is being welded to the metal sheet;

(II) feeding the metal ribbon from a coil (26) of the metal ribbon to adjacency with the metal sheet;

(III) moving the one or more upstanding welding studs (80, 84, 88, 90, 94, 98) of the horn (54) adjacent to the metal ribbon;

(IV) actuating the horn (54) whereby the metal ribbon is ultrasonically welded to the metal sheet; and (V) actuating a cutter assembly (48) to cut the metal ribbon adjacent to the ultrasonically welded metal ribbon and metal sheet.

8. The method of claim 7, which is repeated.

9. The method claim 7, wherein a pneumatic air cylinder assembly (28) moves the ultrasonic stack assembly (22) vertically from a home position downwardly to a welding position and back to the home position.

10. The method claim 7, wherein the metal ribbon is continuously fed for ultrasonic welding to the metal sheet.

11. The method claim 7, wherein the cutter assembly (48) cuts the metal ribbon after the metal ribbon is ultrasonically welded to the metal sheet.

12. A holder assembly (23) for holding an ultrasonic welding horn (54) adaptable for use in an ultrasonic tab welder, which comprises:

(i) an upside down U-shaped upper bracket assembly (60) having downwardly extending legs (116);

(ii) a U-shaped lower bracket assembly (62) having upwardly extending legs (112) and downwardly extending legs (114);

(iii) a generally T-shaped middle holder (64) having a generally downwardly extending vertical leg (118);

(iv) a strain gage assembly (66), which experiences a compressive force of an ultrasonic welding, located between the generally downwardly extending vertical leg (118) of the generally T-shaped middle holder (64) and the upwardly extending legs (112) of the U-shaped lower bracket assembly (62);

(v) a pair of bearing assemblies (65A, 65B) which are located between the downwardly extending legs of the upside down U-shaped upper bracket assembly (60), and both the generally T-shaped middle holder (64) and the U-shaped lower bracket assembly (62);

(vi) an adjustable screw (76) which extends generally vertically adjacent to the generally T-shaped middle holder (64) and into the U-shaped lower bracket assembly (62);

(vii) four brackets (55A, 55B, 55C, and 55D) which extend from the downwardly extending legs (114) of the U-shaped lower bracket assembly (62) and which each respectively house set screw assemblies (57A, 57B, 57C, and 57D) for holding the horn (54); and, (viii) a first laterally extending arm and bolt assembly (63A and 63C) and a second laterally extending arm and bolt assembly (63B and 63D), wherein the first and second laterally extending arm and bolt assemblies ("63A and 63C" and "63B and 63D") allow limited vertical motion of the holder assembly (23) while maintaining a parallel orientation of the horn (54) relative to an anvil (20), wherein a first end of the laterally extending arm and bolt assemblies ("63A and 63C" and "63B and 63D") extends through the generally T-shaped middle holder (64) and a second end of the laterally extending arm and bolt assemblies ("63A and 63C" and "63B and 63D") extends through the U-shaped lower bracket assembly (62) to secure the U-shaped lower bracket assembly (62) and the generally T-shaped middle holder (64) in position, whereby the one or more upstanding welding studs (80, 84, 88, 90, 94, 98) conformingly mate with material to be ultrasonically welded prior to initiation of ultrasonic welding.

13. The holder assembly (23) of claim 12, wherein the each laterally extending arm and bolt assembly ("63A and 63C" and "63B and 63D") comprises two stacked lateral plates having ends through which nut and bolt assemblies are secured.

14. The holder assembly (23) of claim 12, wherein a pneumatic air cylinder assembly (28) moves an ultrasonic stack assembly (22) including the holder assembly (23) and the ultrasonic welding horn (54) vertically from a home position downwardly to a welding position and back to the home position.

* * * * *